(12) United States Patent
Park et al.

(10) Patent No.: US 11,631,898 B2
(45) Date of Patent: Apr. 18, 2023

(54) ELECTROLYTE FOR LITHIUM SECONDARY BATTERY AND LITHIUM SECONDARY BATTERY COMPRISING SAME

(71) Applicant: LG CHEM, LTD., Seoul (KR)

(72) Inventors: In Tae Park, Daejeon (KR); Doo Kyung Yang, Daejeon (KR); Yun Kyoung Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 206 days.

(21) Appl. No.: 15/571,382

(22) PCT Filed: Dec. 1, 2016

(86) PCT No.: PCT/KR2016/014046
§ 371 (c)(1),
(2) Date: Nov. 2, 2017

(87) PCT Pub. No.: WO2017/099420
PCT Pub. Date: Jun. 15, 2017

(65) Prior Publication Data
US 2019/0051940 A1    Feb. 14, 2019

(30) Foreign Application Priority Data

Dec. 8, 2015 (KR) .................. 10-2015-0173910
Nov. 30, 2016 (KR) .................. 10-2016-0161132

(51) Int. Cl.
*H01M 10/05* (2010.01)
*H01M 4/36* (2006.01)
(Continued)

(52) U.S. Cl.
CPC ....... *H01M 10/0568* (2013.01); *H01M 4/366* (2013.01); *H01M 4/382* (2013.01);
(Continued)

(58) Field of Classification Search
None
See application file for complete search history.

(56) References Cited

U.S. PATENT DOCUMENTS 7,674,652 B2    3/2010  Nakai et al.
2002/0039677 A1    4/2002  Iwamoto et al.
(Continued)

FOREIGN PATENT DOCUMENTS

CN    1333580 A    1/2002
CN    1497765 A    5/2004
(Continued)

OTHER PUBLICATIONS

International Search Report, issued in PCT/KR2016/014046 (PCT/ISA/210), dated Mar. 8, 2017.
(Continued)

*Primary Examiner* — Maria Laios
*Assistant Examiner* — Angela J Martin
(74) *Attorney, Agent, or Firm* — Birch, Stewart, Kolasch & Birch, LLP

(57) ABSTRACT

The present disclosure relates to an electrolyte for a lithium secondary battery, and in particular, to a liquid electrolyte capable of stabilizing lithium metal and suppressing lithium dendrite growth, and a lithium secondary battery including the same. The lithium secondary battery provided with the electrolyte according to the present disclosure has an excellent cycle-dependent capacity retention rate, and accordingly, is effective in improving a battery lifespan property.

2 Claims, 1 Drawing Sheet

(51) Int. Cl.
  *H01M 4/38*   (2006.01)
  *H01M 4/62*   (2006.01)
  *H01M 10/0568*   (2010.01)
  *H01M 10/052*   (2010.01)
  *H01M 10/0567*   (2010.01)
  *H01M 10/0569*   (2010.01)
  *H01M 4/02*   (2006.01)

(52) U.S. Cl.
  CPC ......... *H01M 4/628* (2013.01); *H01M 10/052* (2013.01); *H01M 10/0567* (2013.01); *H01M 10/0569* (2013.01); *H01M 2004/027* (2013.01); *H01M 2300/0037* (2013.01)

(56) References Cited

U.S. PATENT DOCUMENTS

| | | | |
|---|---|---|---|
| 2002/0102466 | A1 | 8/2002 | Hwang et al. |
| 2004/0106047 | A1 | 6/2004 | Mie et al. |
| 2005/0042503 | A1* | 2/2005 | Kim .................. H01M 2/166 429/137 |
| 2005/0147886 | A1* | 7/2005 | Mikhaylik ............ H01M 4/382 429/218.1 |
| 2005/0147891 | A1 | 7/2005 | Mikhaylik |
| 2006/0134524 | A1 | 6/2006 | Nakai et al. |
| 2007/0037063 | A1* | 2/2007 | Choi ................ H01M 10/0567 429/330 |
| 2007/0082264 | A1 | 4/2007 | Mikhaylik |
| 2012/0052339 | A1 | 3/2012 | Mikhaylik et al. |
| 2012/0094191 | A1 | 4/2012 | Yoon et al. |
| 2013/0029230 | A1 | 1/2013 | Park et al. |
| 2013/0034776 | A1 | 2/2013 | Noh et al. |
| 2014/0127577 | A1* | 5/2014 | Fleischmann ......... H01M 4/366 429/215 |
| 2014/0170459 | A1 | 6/2014 | Wang et al. |
| 2014/0212771 | A1 | 7/2014 | Garsuch et al. |
| 2014/0342249 | A1 | 11/2014 | He et al. |
| 2015/0249260 | A1 | 9/2015 | Brückner et al. |
| 2015/0249269 | A1 | 9/2015 | Yoon et al. |
| 2016/0020491 | A1* | 1/2016 | Dai .................. H01M 10/0567 429/335 |
| 2016/0172706 | A1* | 6/2016 | Xiao ...................... H01M 4/13 429/189 |
| 2018/0097221 | A1* | 4/2018 | Swonger ............... H01M 4/134 |

FOREIGN PATENT DOCUMENTS

| | | | | |
|---|---|---|---|---|
| CN | 1794511 | A | 6/2006 | |
| CN | 1930725 | A | 3/2007 | |
| CN | 104659410 | A | 5/2015 | |
| CN | 104810546 | A | 7/2015 | |
| CN | 106803580 | A * | 6/2017 | .............. H01M 4/36 |
| JP | 7-302617 | A | 11/1995 | |
| JP | 8-250108 | A | 9/1996 | |
| JP | 2000-268861 | A | 9/2000 | |
| JP | 2006-179305 | A | 7/2006 | |
| JP | 2007-518229 | A | 7/2007 | |
| JP | 2007-518230 | A | 7/2007 | |
| JP | 2015-115270 | A | 6/2015 | |
| KR | 10-0326468 | B1 | 2/2002 | |
| KR | 10-2004-0033678 | A | 4/2004 | |
| KR | 10-2006-0125852 | A | 12/2006 | |
| KR | 10-2006-0125853 | A | 12/2006 | |
| KR | 10-1069100 | B1 | 9/2011 | |
| KR | 10-2011-0117632 | A | 10/2011 | |
| KR | 10-2012-0035638 | A | 4/2012 | |
| KR | 10-2013-0105839 | A | 9/2013 | |
| KR | 10-2014-0034087 | A | 3/2014 | |
| KR | 10-2014-0054282 | A | 5/2014 | |
| KR | 10-2014-0063591 | A | 5/2014 | |
| KR | 10-2014-0138078 | A | 12/2014 | |
| KR | 10-2015-0034499 | A | 4/2015 | |
| KR | 10-2015-0087182 | A | 7/2015 | |
| KR | 10-2015-0102916 | A | 9/2015 | |
| KR | 10-2017-0001375 | A | 1/2017 | |
| WO | WO 2013/008166 | A1 | 1/2013 | |
| WO | WO 2015/158557 | A1 | 10/2015 | |

OTHER PUBLICATIONS

European Search Report for Appl. No. 16873285.7 dated Aug. 23, 2018.

* cited by examiner

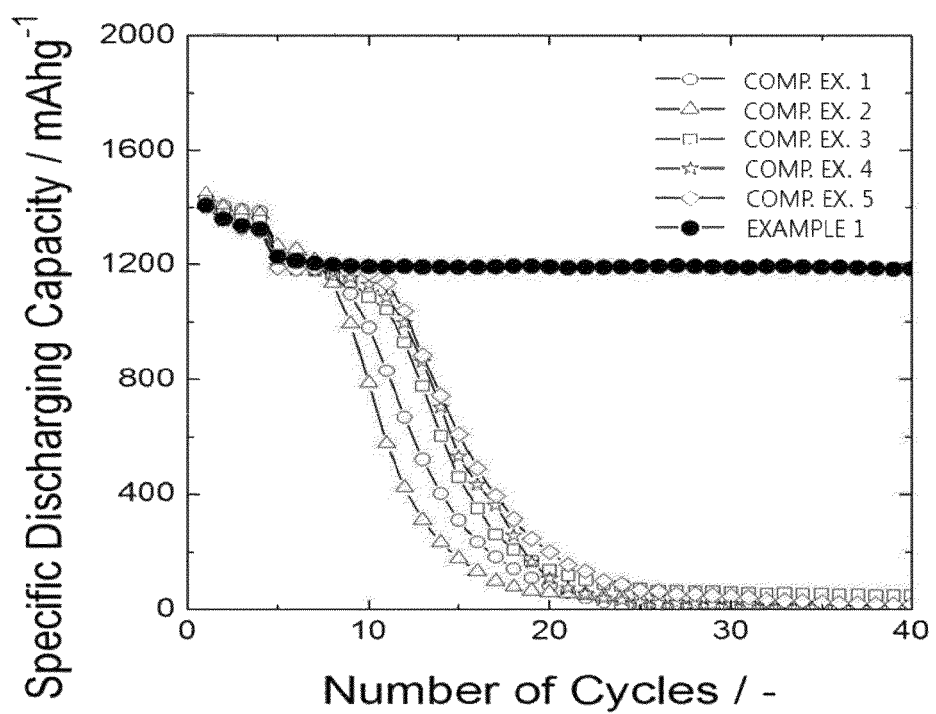

US 11,631,898 B2

ELECTROLYTE FOR LITHIUM SECONDARY BATTERY AND LITHIUM SECONDARY BATTERY COMPRISING SAME

TECHNICAL FIELD

This application claims priority to and the benefits of Korean Patent Application No. 10-2015-0173910, filed with the Korean Intellectual Property Office on Dec. 8, 2015, and Korean Patent Application No. 10-2016-0161132, filed with the Korean Intellectual Property Office on Nov. 30, 2016, the entire contents of which are incorporated herein by reference.

The present disclosure relates to a liquid electrolyte enhancing capacity retention of a lithium secondary battery, and a lithium secondary battery including the same.

BACKGROUND ART

As electronic products, electronic devices, communication devices and the like have rapidly become smaller and lighter recently, and necessity of electric vehicles is widely emerged relating to environmental problems, demands for improving performance of secondary batteries used as a power source of these products have increased. Among these, lithium secondary batteries have received a considerable attention as a high performance battery due to their high energy density and high standard electrode potential.

Among electrode active materials of a lithium secondary battery, lithium metal has an advantage in obtaining highest energy density. However, a lithium metal electrode has a problem of forming lithium dendrite during charge and discharge processes, a problem of lithium corrosion caused by a reaction between the lithium surface and an electrolyte, and the like, and has not been commercialized so far.

Various attempts have been made in order to solve safety and battery short circuit problems of a lithium secondary battery including a lithium metal electrode. As one example, a method of forming a protective layer by coating a lithium metal surface with an inorganic matter such as lithium nitride and LiBON ($Li_xBO_yN_z$, x is from 0.9 to 3.51, y is from 0.6 to 3.2 and z is from 0.5 to 1.0) or a polymer has been proposed. In addition thereto, attempts to enhance stability and efficiency of a lithium metal electrode through an electrolyte composition as in Korean Patent No. 0326468 have been continued, however, electrolyte compositions exhibiting satisfactory performance have not yet been reported.

PRIOR ART DOCUMENTS

Korean Patent No. 0326468, LIQUID ELECTROLYTE FOR LITHIUM SULFUR BATTERY

DISCLOSURE

Technical Problem

As a result of repeated studies on an electrolyte composition in view of the above, the inventors of the present disclosure have completed the present disclosure.

Accordingly, the present disclosure is directed to providing a liquid electrolyte for a lithium secondary battery.

The present disclosure is also directed to providing a lithium secondary battery including the liquid electrolyte for a lithium secondary battery.

Technical Solution

In view of the above, one embodiment of the present disclosure provides an electrolyte for a lithium secondary battery including an ether-based solvent; a fluorine-based lithium salt; and one or more types of additives selected from the group consisting of nitric acid-based compounds, nitrous acid-based compounds, nitro compounds and N-oxide-based compounds, wherein, an anion of the fluorine-based lithium salt has bond dissociation energy of less than 126.4 kcal/mol between a fluorine atom and an atom bonding thereto when calculating with a DFT M06-2X method.

The ether-based solvent may be linear ether, cyclic ether or a mixed solvent thereof.

The linear ether may be one or more types selected from the group consisting of dimethyl ether, diethyl ether, dipropyl ether, dibutyl ether, diisobutyl ether, ethylmethyl ether, ethylpropyl ether, ethyltert-butyl ether, dimethoxymethane, trimethoxymethane, dimethoxyethane, diethoxyethane, dimethoxypropane, diethylene glycol dimethyl ether, diethylene glycol diethyl ether, triethylene glycol dimethyl ether, tetraethylene glycol dimethyl ether, ethylene glycol divinyl ether, diethylene glycol divinyl ether, triethylene glycol divinyl ether, dipropylene glycol dimethylene ether, butylene glycol ether, diethylene glycol ethylmethyl ether, diethylene glycol isopropylmethyl ether, diethylene glycol butylmethyl ether, diethylene glycol tert-butylethyl ether and ethylene glycol ethylmethyl ether.

The cyclic ether may be one or more types selected from the group consisting of dioxolane, methyldioxolane, dimethyldioxolane, vinyldioxolane, methoxydioxolane, ethylmethyldioxolane, oxane, dioxane, trioxane, tetrahydrofuran, methyltetrahydrofuran, dimethyltetrahydrofuran, dimethoxytetrahydrofuran, ethoxytetrahydrofuran, dihydropyran, tetrahydropyran, furan and methylfuran.

In the mixed solvent, the linear ether and the cyclic ether may be mixed in a volume ratio of 5:95 to 95:5.

Preferably, the ether-based solvent may be a mixed solvent of 1,3-dioxolane and 1,2-dimethoxyethane, and more preferably, a volume ratio of the 1,3-dioxolane and the 1,2-dimethoxyethane may be from 5:95 to 95:5.

The fluorine-based lithium salt may be one type selected from the group consisting of lithium bis(fluorosulfonyl)imide, lithium bis(pentafluoroethanesulfonyl)imide, and combinations thereof.

The fluorine-based lithium salt may be included in 0.05 M to 8.0 M.

The nitric acid-based compound may be one or more types selected from the group consisting of lithium nitrate, potassium nitrate, cesium nitrate, barium nitrate and ammonium nitrate.

The nitrous acid-based compound may be one or more types selected from the group consisting of lithium nitrite, potassium nitrite, cesium nitrite and ammonium nitrite.

The nitro compound may be one or more types selected from the group consisting of methyl nitrate, dialkyl imidazolium nitrate, guanidine nitrate, imidazolium nitrate, pyridinium nitrate, ethyl nitrite, propyl nitrite, butyl nitrite, pentyl nitrite, octyl nitrite, nitromethane, nitropropane, nitrobutane, nitrobenzene, dinitrobenzene, nitropyridine, dinitropyridine, nitrotoluene and dinitrotoluene.

The N-oxide-based compound may be one or more types selected from the group consisting of pyridine N-oxide, alkylpyridine N-oxide, and tetramethyl piperidinyloxyl.

The additive may be included in 0.01% by weight to 10% by weight with respect to 100% by weight of the electrolyte.

Another embodiment of the present disclosure provides a lithium secondary battery including the electrolyte.

More specifically, the present disclosure provides a lithium secondary battery including a positive electrode including a positive electrode active material; a negative electrode including lithium metal; a separator; and an electrolyte, wherein the electrolyte is the electrolyte of the present disclosure described above, and a solid electrolyte interphase (SEI) membrane including LiF is formed on a surface of the negative electrode.

The SEI membrane may be formed through charging and discharging the battery 2 times to 7 times to a voltage of 0.1 V to 3 V (vs. Li/Li+).

The SEI membrane may include the LiF in 3.0% by weight or greater with respect to a total weight of the SEI membrane.

The positive electrode active material may be one or more types selected from the group consisting of lithium cobalt-based oxides, lithium manganese-based oxides, lithium copper oxide, lithium nickel-based oxides, lithium manganese composite oxide, lithium-nickel-manganese-cobalt-based oxides, elemental sulfur and sulfur-based compounds.

Advantageous Effects

An electrolyte of the present disclosure is capable of increasing lithium electrode stability by forming a solid membrane on the lithium surface, and exhibits excellent capacity retention and an effect of improving a battery lifespan property when used in a lithium secondary battery.

DESCRIPTION OF DRAWINGS

FIG. 1 is a graph showing capacity retention of examples and comparative examples according to one embodiment of the present disclosure.

MODE FOR DISCLOSURE

Hereinafter, embodiments of the present disclosure will be described in detail with reference to the accompanying drawings so that those skilled in the art may readily implement the present disclosure. However, the present disclosure may be implemented in various different aspects, and is not limited to the embodiments described below.

In the present specification, a numerical range represented using [to] represents a range including values described before and after [to] as a minimum value and a maximum value, respectively.

Electrolyte

One embodiment of the present disclosure provides an electrolyte for a lithium secondary battery including an ether-based solvent; a fluorine-based lithium salt; and one or more types of additives selected from the group consisting of nitric acid-based compounds, nitrous acid-based compounds, nitro compounds and N-oxide-based compounds, wherein, an anion of the fluorine-based lithium salt has bond dissociation energy of less than 126.4 kcal/mol between a fluorine atom and an atom bonding thereto when calculating with a DFT M06-2X method.

The electrolyte of the present disclosure satisfying the above-mentioned composition forms a solid membrane (SEI membrane) on the lithium metal surface, and as a result, lithium dendrite formation is suppressed and lithium electrode stability is enhanced. Accordingly, efficiency, cycle lifespan and safety of a lithium secondary battery including the lithium metal electrode may be enhanced.

The ether-based solvent according to the present disclosure may be linear ether, cyclic ether, or a mixed solvent thereof.

Nonlimiting examples of the linear ether may include one or more types selected from the group consisting of dimethyl ether, diethyl ether, dipropyl ether, dibutyl ether, diisobutyl ether, ethylmethyl ether, ethylpropyl ether, ethyltert-butyl ether, dimethoxymethane, trimethoxymethane, dimethoxyethane, diethoxyethane, dimethoxypropane, diethylene glycol dimethyl ether, diethylene glycol diethyl ether, triethylene glycol dimethyl ether, tetraethylene glycol dimethyl ether, ethylene glycol divinyl ether, diethylene glycol divinyl ether, triethylene glycol divinyl ether, dipropylene glycol dimethylene ether, butylene glycol ether, diethylene glycol ethylmethyl ether, diethylene glycol isopropylmethyl ether, diethylene glycol butylmethyl ether, diethylene glycol tert-butylethyl ether and ethylene glycol ethylmethyl ether.

Nonlimiting examples of the cyclic ether may include one or more types selected from the group consisting of dioxolane, methyldioxolane, dimethyldioxolane, vinyldioxolane, methoxydioxolane, ethylmethyldioxolane, oxane, dioxane, trioxane, tetrahydrofuran, methyltetrahydrofuran, dimethyltetrahydrofuran, dimethoxytetrahydrofuran, ethoxytetrahydrofuran, dihydropyran, tetrahydropyran, furan and methylfuran.

Preferably, the ether-based solvent may be 1,3-dioxolane, 1,2-dimethoxyethane, tetrahydrofuran, 2,5-dimethylfuran, furan, 2-methylfuran, 1,4-oxane, 4-methyl-1,3-dioxolane, tetraethylene glycol dimethyl ether or a mixed solvent thereof.

More specifically, the ether-based solvent may be a mixed solvent selecting one type each from the linear ether and the cyclic ether and mixing these, and herein, the mixing ratio may be from 5:95 to 95:5 in a volume ratio.

The mixed solvent may preferably be a mixed solvent of 1,3-dioxolane (DOL) and 1,2-dimethoxyethane (DME). Herein, the DOL and the DME may be mixed in a volume ratio of 5:95 to 95:5, preferably in a volume ratio of 30:70 to 70:30 and more preferably in a volume ratio of 40:60 to 60:40.

The ether-based solvent has a high donor number while reducing electrolyte viscosity, and therefore, is capable of increasing the degree of dissociation of a lithium salt by lithium cation chelation, and greatly enhancing ion conductivity of the liquid electrolyte. Ion conductivity is generally determined by mobility of ions in an electrolyte solution, and therefore, factors affecting ion conductivity are viscosity of the electrolyte solution and ion concentration in the solution. As the viscosity of the solution decreases, ions freely move in the solution and ion conductivity increases, and when ion concentration increases in the solution, the amount of ions, a charge transporter, increases leading to an increase in the ion conductivity.

The electrolyte according to the present disclosure includes a fluorine-based lithium salt including one or more fluorine atoms in the anion. The fluorine-based lithium salt increases ion conductivity of the electrolyte, forms a solid and stable SEI membrane including LiF on the lithium electrode surface, and performs a role of enhancing safety and lifespan of a battery.

An anion of the fluorine-based lithium salt preferably has bond dissociation energy (BDE) of less than 126.4 kcal/mol between a fluorine atom and an atom bonding thereto when calculating with a DFT M06-2X method. When non-equivalent fluorine is present in the anion, lowest BDE becomes a base.

Herein, calculation of the bond dissociation energy may be carried out using a density functional theory (DFT) method (M06-2X/6-31+G* level) using a Gaussian 09 program. More specifically, BDE may be calculated by comparing reaction energy of a reaction forming fluorine radicals by a bond between fluorine and an atom corresponding thereto being broken under a conductor-like polarizable continuum model (CPCM) condition employing a dielectric constant as 7.2 and initial charge of the lithium salt anion as −1.

As one example, BDE of lithium bis(fluorosulfonyl)imide (LiFSI, $(SO_2F)_2NLi$) is a value calculating reaction energy of the reaction represented by the following Reaction Formula 1 using the above-mentioned method. LiFSI has BDE of 101.4 kcal/mol, which makes it one of most preferred fluorine-based lithium salts to use in the electrolyte of the present disclosure.

[Reaction Formula 1]

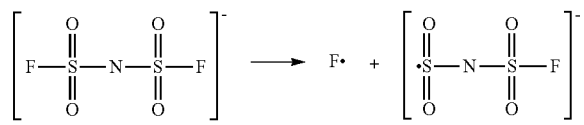

An electrolyte of a lithium secondary battery produces an oxidation-reduction reaction at an interface while being in contact with a metal, carbon or an oxide electrode. As a result, materials such as LiF, $Li_2CO_3$, $LiO_2$ and LiOH are produced to form a membrane on a negative electrode surface, and such a membrane is referred to as a solid electrolyte interface (hereinafter, SEI) membrane.

After once formed by initial charge, a SEI membrane prevents a reaction between lithium ions and a negative electrode or other materials when repeating charge and discharge caused by battery use, and the SEI membrane performs a role of an ion tunnel passing through only lithium ions between a liquid electrolyte and a negative electrode. Particularly, stability and performance of a battery are known to be improved as a ratio of LiF increases among the constituents of the SEI membrane.

Together with the ether-based solvent and the additives, the fluorine-based lithium salt used in the present disclosure contributes to the formation of a solid and stable SEI membrane on the negative electrode surface. Particularly, when using the electrolyte of the present disclosure including the fluorine-based lithium salt in a lithium secondary battery using a lithium metal electrode, the content of LiF is identified to be high among the constituents of the SEI membrane. Such a solid and stable SEI membrane having a high LiF content suppresses lithium dendrite growth, improves an initial output property, low temperature and high temperature output properties of a battery, suppresses positive electrode surface decomposition that may occur during a high temperature cycle operation of 45° C. or higher and prevents an oxidation reaction of the liquid electrolyte, and as a result, is capable of enhancing a capacity property of a lithium secondary battery.

Nonlimiting examples of the fluorine-based lithium salt may include lithium bis(fluorosulfonyl)imide (LiFSI, $(SO_2F)_2NLi$, BDE=101.4 kcal/mol), lithium bis(pentafluoroethanesulfonyl)imide (LiBETI, $(C_2F_5SO_2)_2NLi$, BDE=119.7 kcal/mol) and the like, and preferably, the fluorine-based lithium salt may be LiFSI.

LiFSI has a melting point of 145° C., and is thermally stable up to 200° C. LiFSI exhibits higher electric conductivity compared to $LiPF_6$ and LiTFSI ($(CF_3SO_2)_2NLi$), and is particularly favored when used in polymer batteries. In addition, LiFSI is more stable than $LiPF_6$ in terms of hydrolysis and has lower corrosiveness than LiTFSI, and therefore, problems such as current collector corrosiveness that used to occur when using LiTFSI as a liquid electrolyte lithium salt may be improved.

According to one embodiment of the present disclosure, the fluorine-based lithium salt is included in a concentration of 0.05 M to 8.0 M, preferably 0.1 M to 4.0 M and more preferably 0.2 M to 2.0 M. When the concentration is less than the above-mentioned range, effects of output improvement and cycle property improvement of a lithium secondary battery are insignificant, and when the concentration is greater than the above-mentioned range, side reactions in the liquid electrolyte excessively occur when charging and discharging a battery resulting in continuous generation of gas due to positive electrode surface decomposition during a high temperature cycle, and it may lead to a swelling phenomenon increasing a thickness of the battery.

The electrolyte according to the present disclosure is a lithium salt and may use the fluorine-based lithium salt either alone or as a combination, and may additionally include an auxiliary lithium salt commonly used in the art such as LiCl, LiBr, LiI, LiSCN, $LiClO_4$, $LiBF_4$, $LiB_{10}Cl_{10}$, $LiCF_3SO_3$, $LiCF_3CO_2$, $LiC_4BO_8$, $LiAsF_6$, $LiSbF_6$, $LiAlCl_4$, $CH_3SO_3Li$, $CF_3SO_3Li$, $(CF_3SO_2)_2NLi$, $(CF_3SO_2)_3CLi$, chloroborane lithium, lower aliphatic lithium carbonate, tetra phenyl lithium borate and lithium imide. If the lithium salt concentration is too high, mobility of lithium ions may decrease due to increased electrolyte viscosity and this may cause decline of battery performance. Therefore, a total molar concentration of the lithium salt included in the electrolyte is preferably not to exceed 8.0 M.

The electrolyte of the present disclosure includes one or more types of additives selected from the group consisting of nitric acid-based compounds, nitrous acid-based compounds, nitro compounds and N-oxide-based compounds. The additive is used with the ether-based solvent and the fluorine-based lithium salt to form a stable membrane on the lithium electrode and greatly enhance charge and discharge efficiency.

Nonlimiting examples of the additive may include lithium nitrate, potassium nitrate, cesium nitrate, barium nitrate, ammonium nitrate, methyl nitrate, dialkyl imidazolium nitrate, guanidine nitrate, imidazolium nitrate, pyridinium nitrate and the like as the nitric acid-based compound, may include lithium nitrite, potassium nitrite, cesium nitrite, ammonium nitrite, ethyl nitrite, propyl nitrite, butyl nitrite, pentyl nitrite, octyl nitrite and the like as the nitrous acid-based compound, may include nitromethane, nitropropane, nitrobutane, nitrobenzene, dinitrobenzene, nitropyridine, dinitropyridine, nitrotoluene, dinitrotoluene and the like as the nitro compound, and may include pyridine N-oxide, alkylpyridine N-oxide, tetramethyl piperidinyloxyl and the like as the N-oxide-based compound.

The additive may preferably be a nitric acid-based compound, and the additive more preferably include lithium nitrate ($LiNO_3$).

The additive is used in a range of 0.01% to 10% by weight and preferably 0.1% to 5% by weight within 100% by weight of the whole electrolyte composition. When the content is less than the above-mentioned range, the above-mentioned effects may not be secured, and the content being greater than the above-mentioned range causes a concern of increasing resistance due to the membrane, and therefore, the content is properly controlled within the above-mentioned range.

As described above, the electrolyte according to the present disclosure includes all three constituents of an ether-based solvent, a fluorine-based lithium salt and an additive to form a stable and solid SEI membrane on lithium metal and thereby strengthen lithium metal electrode stability, and particularly in a Li-S battery, a problem of side reactions (shuttle phenomenon) occurring due to lithium polysulfide elution may be solved.

According to test examples of the present disclosure, batteries using electrolytes of examples including all three of the constituents have stable battery properties, however, satisfactory battery properties are not secured when using a different type of solvent (Comparative Example 1), when using a different type of lithium salt (Comparative Examples 2 and 3), when using only the ether-based solvent and the fluorine-based lithium salt (Comparative Example 4) and when using only the ether-based solvent and the additive (Comparative Example 5). This will be described below in more detail.

A method for preparing the electrolyte according to the present disclosure is not particularly limited, and common methods known in the art may be used.

Lithium Secondary Battery

The non-aqueous liquid electrolyte for a lithium secondary battery of the present disclosure described above is used in a common lithium secondary battery provided with a negative electrode and a positive electrode. The lithium secondary battery according to the present disclosure may be a lithium secondary battery including a positive electrode and a negative electrode provided opposite to each other; a separator provided between the positive electrode and the negative electrode; and an electrolyte impregnated in the positive electrode, the negative electrode and the separator, and having ion conductivity, and one aspect of the present disclosure may be a lithium-sulfur battery.

Particularly, the lithium secondary battery of the present disclosure may be a battery including lithium metal as a negative electrode active material, and may form a SEI membrane including LiF on the negative electrode surface.

The SEI membrane may be formed from chemical spontaneous reaction caused from a contact between the liquid electrolyte and the Li negative electrode, or charging and discharging the battery for one time or greater, preferably 2 times to 7 times, to a voltage of 0.1 V to 3 V (vs. Li/Li+). Preferably, the SEI membrane may include the LiF in 3.0% by weight or greater and preferably 3.0% to 5.0% by weight with respect to the total weight of the SEI membrane.

Such a SEI membrane having a high LiF content has excellent stability and suppresses a decomposition reaction of the electrolyte, and is effective in improving a lithium dendrite formation problem occurring when a lithium metal electrode is used. Accordingly, the lithium secondary battery including the electrolyte of the present disclosure exhibits excellent capacity retention and lifespan property.

Herein, the LiF content may be obtained by disassembling the battery after repeating charge and discharge and analyzing the lithium metal surface using X-ray photoelectron spectroscopy (XPS). As one example, the XPS analysis may be carried out through an EQC0124 system (VG Scientific ESCALAB 250), and may be carried out by progressing depth profiling under vacuum atmosphere, and measuring and analyzing a survey scan spectrum and a narrow scan spectrum.

Positive Electrode

The positive electrode according to the present disclosure includes a positive electrode active material formed on a positive electrode current collector.

The positive electrode current collector is not particularly limited as long as it has high conductivity without inducing chemical changes in the concerned battery, and examples thereof may include stainless steel, aluminum, nickel, titanium, baked carbon, or aluminum or stainless steel of which surface is treated with carbon, nickel, titanium, silver or the like. Herein, the positive electrode current collector may be used in various forms such as films, sheets, foil, nets, porous bodies, foams and non-woven fabrics having fine unevenness formed on the surface so as to increase adhesive strength with the positive electrode active material.

As the positive electrode active material, all positive electrode active materials usable in the art may be used. For example, one or more types selected from the group consisting of lithium-containing transition metal oxides, that is, lithium cobalt-based oxides, lithium manganese-based oxides, lithium copper oxide, lithium nickel-based oxides, lithium manganese composite oxide and lithium-nickel-manganese-cobalt-based oxides may be preferably used as the positive electrode active material, and examples thereof may include any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$ ($0<y<1$), $LiCo_{1-y}Mn_yO_2$ ($0<y<1$), $LiNi_{1-y}Mn_yO_2$ ($0≤y<1$), $Li(Ni_aCo_bMn_c)O_4$ ($0<a<2$, $0<b<2$, $0<c<2$, $a+b+c=2$), $LiMn_{2-z}Ni_zO_4$ ($0<z<2$), $LiMn_{2-z}Co_zO_4$ ($0<z<2$), $LiCoPO_4$ and $LiFePO_4$ or a mixture of two or more types thereof.

In addition, according to one embodiment of the present disclosure, the lithium secondary battery may be a lithium-sulfur battery, and herein, the positive electrode active material may include elemental sulfur ($S_8$), sulfur-based compounds or mixtures thereof. The sulfur-based compound may be specifically $Li_2S_n(n≥1)$, an organosulfur compound, a carbon-sulfur polymer ($(C_2S_x)_n$: $x=2.5$ to 50, $n≥2$) or the like. In addition, the positive electrode active material may effectively suppress lithium polysulfide elution by using a compound (S-PAN) of a sulfur (S) based material and polyacrylonitrile (PAN).

According to another embodiment of the present disclosure, the lithium secondary battery may be a lithium-air battery using oxygen as a positive electrode active material. Herein, the positive electrode may use a conductive material, and the conductive material may be porous. For example, carbon-based materials having porosity, that is, carbon black, graphite, graphene, activated carbon, carbon fiber and the like may be used. In addition, metallic conductive materials such as metal fibers and metal meshes may be used. Metallic powders such as copper, silver, nickel and aluminum may be included. Organic conductive materials such as polyphenylene derivatives may be used. The conductive materials may be used either alone or as a mixture thereof.

To the positive electrode, a catalyst for oxygen oxidation/reduction may be added, and as such a catalyst, precious metal-based catalysts such as platinum, gold, silver, palladium, ruthenium, rhodium and osmium, oxide-based catalysts such as manganese oxide, iron oxide, cobalt oxide and nickel oxide, or organometal-based catalysts such as cobalt phthalocyanine may be used, however, the catalyst is not limited thereto, and those usable as an oxygen oxidation/reduction catalyst in the art may all be used.

In addition, the catalyst may be supported in a support. The support may be any one selected from the group consisting of oxides, zeolite, clay-based mineral, carbon and mixtures thereof. The oxide may be an oxide such as alumina, silica, zirconium oxide and titanium oxide, or an oxide including any one selected from the group consisting of Ce, Pr, Sm, Eu, Tb, Tm, Yb, Sb, Bi, V, Cr, Mn, Fe, Co, Ni, Cu, Nb, Mo, W and mixtures thereof.

The positive electrode may further include a conductor and a binder.

The conductor is used for further enhancing conductivity of the electrode active material. Such a conductor is not particularly limited as long as it has conductivity without inducing chemical changes in the concerned battery, and the conductor may be porous. For example, carbon-based materials having porosity may be used. As such carbon-based materials, carbon black, graphite, graphene, activated carbon, carbon fiber and the like may be used. In addition, metallic fibers such as metal meshes; metallic powders such as copper, silver, nickel and aluminum; or organic conductive materials such as polyphenylene derivatives may also be used. The conductive materials may be used either alone or as a mixture thereof.

The binder is used for binding of the electrode active material and the conductor, and binding for the current collector, and may include thermoplastic resins or thermosetting resins. For example, polyethylene, polypropylene, polyacrylonitrile, polymethyl methacrylate, polytetrafluoroethylene (PTFE), polyvinylidene fluoride (PVDF), styrene-butadiene rubber, a tetrafluoroethylene-perfluoro alkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, an ethylene-acrylic acid copolymer and the like may be used either alone or as a mixture thereof, however, the binder is not limited thereto, and those usable as a binder in the art may all be used.

Such a positive electrode may be prepared using common methods, and specifically, may be prepared by preparing a composition for forming a positive electrode active material layer through mixing a positive electrode active material, a conductor and a binder in an organic solvent, coating and drying the composition on a current collector, and selectively, extrusion molding the composition on the current collector for enhancing electrode density. Herein, as the organic solvent, using solvents capable of uniformly dispersing the positive electrode active material, the binder and the conductor and being readily evaporated is preferred. Specifically, acetonitrile, methanol, ethanol, tetrahydrofuran, water, isopropyl alcohol and the like may be included.

Negative Electrode

The negative electrode according to the present disclosure includes a negative electrode active material formed on a negative electrode current collector.

Specifically, the negative electrode current collector may be selected from the group consisting of copper, stainless steel, titanium, silver, palladium, nickel, alloys thereof and combinations thereof. The stainless steel may be surface treated with carbon, nickel, titanium or silver, and aluminum-cadmium alloys may be used as the alloy. In addition thereto, baked carbon, non-conductive polymers of which surface is treated with a conductor, conductive polymers or the like may also be used.

As the negative electrode active material, materials capable of intercalating or disintercalating lithium ions or materials capable of reversibility forming lithium-containing compounds by reacting with lithium ions may be used. For example, carbon materials such as low crystalline carbon and high crystalline carbon may be included as an example. Low crystalline carbon typically includes soft carbon and hard carbon, and high crystalline carbon typically includes natural graphite, Kish graphite, pyrolytic carbon, mesophase pitch based carbon fiber, meso-carbon microbeads, mesophase pitches and high temperature baked carbon such as petroleum or coal tar pitch derived cokes. In addition thereto, tin oxide, titanium nitrate, silicon, alloy series including silicon or oxide such as $Li_4Ti_5O_{12}$ is also a well-known negative electrode active material.

In addition, the negative electrode active material may be lithium metal or a lithium alloy. As nonlimiting examples, the negative electrode may be a thin film of lithium metal, or an ally of lithium and one or more types of metals selected from the group consisting of Na, K, Rb, Cs, Fr, Be, Mg, Ca, Sr, Ba, Ra, Al and Sn.

As one aspect of the present disclosure, the negative electrode may include lithium metal as the negative electrode active material, and more specifically, may be a lithium metal thin film binding on a current collector.

The negative electrode may further include a conductor for further enhancing conductivity of the electrode active material, and a binder for binding of the negative electrode active material and the conductor and binding for the current collector, and specifically, the binder and the conductor may be same as those previously described in the positive electrode.

Separator

Common separators may be provided between the positive electrode and the negative electrode. The separator is a physical separator having a function of physically separating electrodes, and those used as common separators may be used without particular limit, and particularly, those having an excellent electrolyte moisture retention ability while having low resistance for ion migration of the electrolyte are preferred.

In addition, the separator enables lithium ion transport between the positive electrode and the negative electrode while separating and insulating the positive electrode and the negative electrode. Such a separator is porous and may be formed with non-conductive or insulating materials. The separator may be an independent member such as a film, or a coating layer added to the positive electrode and/or the negative electrode.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

The positive electrode, the negative electrode and the separator included in the lithium secondary battery may each be prepared using common components and preparation methods.

In addition, an appearance of the lithium secondary battery of the present disclosure is not particularly limited, and a cylinder-type, a square-type, a pouch-type or a coin-type using a can, or the like, may be included.

Hereinafter, the present disclosure will be described in detail with reference to examples. However, the examples of the present disclosure may be modified to various other forms, and the scope of the present disclosure is not construed as being limited to the examples described below. The examples of the present disclosure are provided in order to more completely describe the present disclosure to those having average knowledge in the art.

EXAMPLE

Preparation Example 1

Preparation of Liquid Electrolyte

Example 1

A non-aqueous liquid electrolyte was prepared by adding 1.0 M of LiFSI (BDE=101.4 kcal/mol) and 1 wt % of $LiNO_3$ based on the total amount of the liquid electrolyte to a mixed solvent including a non-aqueous organic solvent having a composition of 1,3-dioxolane (DOL) and 1,2-dimethoxyethane (DME) in a volume ratio of 1:1.

Comparative Example 1

A non-aqueous liquid electrolyte was prepared by adding 1.0 M of LiFSI and 1 wt % of $LiNO_3$ based on the total amount of the liquid electrolyte to a mixed solvent including a non-aqueous organic solvent having a composition of ethylene carbonate (EC) and dimethyl carbonate (DMC) in a volume ratio of 1:1.

Comparative Example 2

A non-aqueous liquid electrolyte was prepared by adding 1.0 M of LiTFSI (BDE=126.4 kcal/mol) and 1 wt % of $LiNO_3$ based on the total amount of the liquid electrolyte to a mixed solvent including a non-aqueous organic solvent having a composition of 1,3-dioxolane (DOL) and 1,2-dimethoxyethane (DME) in a volume ratio of 1:1.

Comparative Example 3

A non-aqueous liquid electrolyte was prepared by adding 1.0 M of $LiPF_6$ (BDE=146.2 kcal/mol) and 1 wt % of $LiNO_3$ based on the total amount of the liquid electrolyte to a mixed solvent including a non-aqueous organic solvent having a composition of 1,3-dioxolane (DOL) and 1,2-dimethoxyethane (DME) in a volume ratio of 1:1.

Comparative Example 4

A non-aqueous liquid electrolyte including a non-aqueous organic solvent having a composition of 1,3-dioxolane (DOL) and 1,2-dimethoxyethane (DME) in a volume ratio of 1:1, and 1.0 M of LiFSI was prepared.

Comparative Example 5

A non-aqueous liquid electrolyte was prepared by adding 1 wt % of $LiNO_3$ based on the total amount of a non-aqueous organic solvent having a composition of 1,3-dioxolane (DOL) and 1,2-dimethoxyethane (DME) in a volume ratio of 1:1.

Preparation Example 2

Manufacture of Lithium-Sulfur Battery

A sulfur-based material that is sulfur (average particle size: 5 μm) was heated with polyacrylonitrile (PAN) for 6 hours at 300° C. under $N_2$ gas atmosphere to prepare a sulfur-carbon compound (S-PAN). The S-PAN active material prepared as above was mixed with a conductor and a binder in acetonitrile using a ball mill to prepare a composition for forming a positive electrode active material layer. Herein, carbon black was used as the conductor, and polyethylene oxide (molecular weight 5,000,000 g/mol) was used as the binder, and the mixing ratio of the sulfur-based material:conductor:binder was employed as 80:10:10 in a weight ratio. The prepared composition for a positive electrode active material layer was coated on an aluminum current collector and then the result was dried to prepare a 1.0 mAh/$cm^2$ class positive electrode. Herein, porosity of the positive electrode active material layer was 60%, and the thickness was 40 μm. In addition, lithium metal having a thickness of 150 μm was laminated on copper foil having a thickness of 20 μm to prepare a negative electrode.

The prepared positive electrode and negative electrode were placed facing each other, a polyethylene separator having a thickness of 20 μm was provided therebetween, and the result was filled with each of the liquid electrolytes of Example 1 and Comparative Examples 1 to 5 prepared above.

Test Example 1

Component Analysis of SEI Membrane

Two lithium-sulfur batteries including the electrolyte of Example 1 and two lithium-sulfur batteries including the electrolyte of Comparative Example 2 were prepared, each battery was 3.0 V (vs. Li/Li+) charged at a rate of 0.1 C and 1.0 V (vs. Li/Li+) discharged at a rate of 0.1 C, and charge and discharge were repeated 5 times, and the battery was disassembled. A LiF content (% by weight) was calculated by analyzing the lithium metal surface using X-ray photoelectron spectroscopy (EQC0124 system, VG Scientific ESCALAB 250) (progressing depth profiling under vacuum atmosphere and measuring a survey scan spectrum and a narrow scan spectrum).

As a result of the test, the lithium-sulfur batteries including the electrolyte of Example 1 each had a LiF content of 3.2% and 3.3%. Meanwhile, it was identified that the batteries including the electrolyte of Comparative Example 2 each had a LiF content of 2.9% and 2.3%.

Test Example 2

Measurement of Charge and Discharge Properties by Cycle

Charge and discharge properties of the lithium-sulfur batteries manufactured above were measured, and the results are shown in the following Table 1 and FIG. 1.

TABLE 1

| | Solvent | Lithium Salt | Additive | Normal Number of Cycle |
|---|---|---|---|---|
| Example 1 | DOL:DME (50:50, v/v) | 1.0M LiFSI | 1 wt % LiNO$_3$ | 40 Times or More |
| Comparative Example 1 | EC:DEC (50:50, v/v) | 1.0M LiFSI | 1 wt % LiNO$_3$ | 9 Times |
| Comparative Example 2 | DOL:DME (50:50, v/v) | 1.0M LiTFSI | 1 wt % LiNO$_3$ | 8 Times |
| Comparative Example 3 | DOL:DME (50:50, v/v) | 1.0M LiPF$_6$ | 1 wt % LiNO$_3$ | 10 Times |
| Comparative Example 4 | DOL:DME (50:50, v/v) | 1.0M LiFSI | — | 11 Times |
| Comparative Example 5 | DOL:DME (50:50, v/v) | — | 1 wt % LiNO$_3$ | 12 Times |

As shown in Table 1 and FIG. 1, charge and discharge capacity rapidly decreased in 10 cycles to 20 cycles in the lithium-sulfur batteries using the electrolytes of Comparative Examples 1 to 5, and initial charge and discharge capacity (1200 mAh/g) was stably maintained even after 40 cycles in the lithium-sulfur battery using the electrolyte of Example 1, one embodiment of the present disclosure.

From such a result, it was identified that three constituents of an ether-based solvent; a fluorine-based lithium salt having anion bond dissociation energy of less than 126.4 kcal/mol; and one or more types of additives selected from the group consisting of nitric acid-based compounds, nitrous acid-based compounds, nitro compounds and N-oxide-based compounds need to be all included in order to enhance a capacity retention of a battery, and an electrolyte satisfying the combination exhibits an excellent lifespan property when used in a lithium secondary battery.

Hereinbefore, preferred embodiments of the present disclosure have been described in detail, however, the scope of a right of the present disclosure is not limited thereto, and various modifications and improvements made by those skilled in the art using basic concepts of the present disclosure defined in the attached claims also belong to the scope of a right of the present disclosure.

The invention claimed is:

1. A lithium secondary battery comprising:
   a positive electrode including a positive electrode active material;
   a negative electrode including lithium metal;
   a separator; and
   an electrolyte,
   wherein the electrolyte comprises,
   a solvent consisting of an ether-based solvent;
   1.0 M of LiFSI; and
   1 wt % of LiNO$_3$ based on the total amount of the liquid electrolyte;
   wherein the ether-based solvent is a mixed solvent in which 1,3-dioxolane (DOL) and 1,2-dimethoxyethane (DME) are mixed in a volume ratio of 1:1;
   wherein a solid electrolyte interphase (SEI) membrane including LiF is formed on a surface of the negative electrode by charging and discharging the battery 2 times to 7 times to a voltage of 0.1 V to 3 V (vs. Li/Li+), and
   wherein the SEI membrane includes the LiF in 3.0% by weight or greater with respect to a total weight of the SEI membrane.

2. The lithium secondary battery of claim 1, wherein the positive electrode active material is one or more types selected from the group consisting of lithium cobalt-based oxides, lithium manganese-based oxides, lithium copper oxide, lithium nickel-based oxides, lithium manganese composite oxide, lithium-nickel-manganese-cobalt-based oxides, elemental sulfur and sulfur-based compounds.

* * * * *